United States Patent
Akiyama

(10) Patent No.: US 11,262,274 B2
(45) Date of Patent: Mar. 1, 2022

(54) METHOD FOR DESIGNING SHAFT TORQUE CONTROLLER AND FEEDBACK CONTROLLER OF TEST SYSTEM, AND SHAFT TORQUE CONTROLLER DESIGNED ON BASIS OF SAME DESIGN METHOD

(71) Applicant: MEIDENSHA CORPORATION, Tokyo (JP)

(72) Inventor: Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/312,685

(22) PCT Filed: Sep. 11, 2019

(86) PCT No.: PCT/JP2019/035712
§ 371 (c)(1),
(2) Date: Jun. 10, 2021

(87) PCT Pub. No.: WO2020/121611
PCT Pub. Date: Jun. 18, 2020

(65) Prior Publication Data
US 2021/0356360 A1      Nov. 18, 2021

(30) Foreign Application Priority Data
Dec. 11, 2018 (JP) .............................. JP2018-231488

(51) Int. Cl.
*G01M 13/025* (2019.01)
(52) U.S. Cl.
CPC ................. *G01M 13/025* (2013.01)
(58) Field of Classification Search
CPC .................................................. G01M 13/025
See application file for complete search history.

(56) References Cited

U.S. PATENT DOCUMENTS

| 2003/0083793 A1* | 5/2003 | Akiyama | ............ G01M 15/044 |
| | | | 701/114 |
| 2003/0088345 A1* | 5/2003 | Akiyama | ............ G01M 15/044 |
| | | | 701/32.8 |

(Continued)

FOREIGN PATENT DOCUMENTS

| JP | 3320824 B2 | 9/2002 |
| JP | 2018-168332 | 9/2018 |

(Continued)

OTHER PUBLICATIONS

Kimishima, Kazuki and Hidekazu Nishimura, Jan. 2001. "Robust Control of Engine Test Bed for Vehicle Motion Simulation," Transactions of the Japan Society of Mechanical Engineers Series C, vol. 67, Issue 653, 10 pages.

(Continued)

*Primary Examiner* — Eric S. McCall
(74) *Attorney, Agent, or Firm* — Muncy, Geissler, Olds & Lowe, P.C.

(57) ABSTRACT

This design method is provided with a design process for a computer to design a μ controller satisfying a prescribed design condition in a feedback control system provided with the μ controller and a generalized plant. Set in the design process are: an integration operation amount calculation unit which calculates an integration operation amount; a summing unit which sums the output from the μ controller and the integration operation amount and generates an input to a nominal plant; a first control amount output port which outputs, as a first control amount output, an output obtained by multiplying the deviation input by a weight function Ge(s); and a second control amount output port which outputs, as a second control amount output, an output obtained by multiplying the output from the μ controller by a weight function Gip(s).

17 Claims, 6 Drawing Sheets

(56) References Cited

U.S. PATENT DOCUMENTS

| | | | |
|---|---|---|---|
| 2014/0019081 A1* | 1/2014 | Suzuki | G01M 15/02 |
| | | | 702/113 |
| 2015/0219529 A1* | 8/2015 | Akiyama | G01M 13/025 |
| | | | 73/115.01 |
| 2016/0139002 A1* | 5/2016 | Akiyama | B60C 99/006 |
| | | | 73/115.01 |
| 2017/0350775 A1 | 12/2017 | Akiyama et al. | |
| 2019/0219481 A1 | 7/2019 | Akiyama | |
| 2020/0408641 A1* | 12/2020 | Akiyama | G01L 3/02 |
| 2021/0003479 A1* | 1/2021 | Akiyama | G01M 15/02 |
| 2021/0011454 A1* | 1/2021 | Kanke | G01M 99/00 |
| 2021/0247251 A1* | 8/2021 | Akiyama | G01L 3/045 |
| 2021/0318205 A1* | 10/2021 | Akiyama | G01M 99/007 |

FOREIGN PATENT DOCUMENTS

| | | |
|---|---|---|
| WO | WO-2016/117394 A1 | 7/2016 |
| WO | WO-2017/221876 A1 | 12/2017 |

OTHER PUBLICATIONS

Notice of Reasons for Rejection issued to JP Application No. 2018-231488, dated Dec. 3, 2019 (with English machine translation).

* cited by examiner

METHOD FOR DESIGNING SHAFT TORQUE CONTROLLER AND FEEDBACK CONTROLLER OF TEST SYSTEM, AND SHAFT TORQUE CONTROLLER DESIGNED ON BASIS OF SAME DESIGN METHOD

TECHNICAL FIELD

The present invention relates to a method for designing a shaft torque controller and a shaft torque controller of a test system, and a shaft torque controller designed by this design method. In more detail, the present invention relates to a design method for designing a shaft torque controller and a feedback controller based on a generalized plant, and a shaft torque controller designed by this design method.

BACKGROUND ART

Drive train refers to an abbreviation for a plurality of devices for transferring energy generated by an engine to drive wheels, and is configured by an engine, clutch, transmission, drive shaft, propeller shaft, differential gear, drive wheels, etc. In the test system of a drivetrain, the durability performance, quality, etc. of the drivetrain are evaluated while applying load torque imitating the inertia of the tires and vehicle body to the output shaft by actually driving the transmission with an engine, and electric inertia controlling an output-side dynamometer connected to this output shaft.

In addition, with such a test system, it has been proposed to generate a drive torque inputted to the input shaft of the drive train by the dynamometer instead of an actual engine, by coupling the dynamometer to the input shaft of the drive train, and driving this dynamometer using a shaft torque controller. In addition, in recent years, technology has also been proposed for designing the shaft torque controller used in the test system by a controller design method based on a general plant such as μ synthesis or H∞ control (for example, refer to Non-patent Document 1).

Patent Document 1: Japanese Patent Application No. 2018-168332

Non-Patent Document 1: Kimishima, Kazuki and Hidekazu Nishimura, 2001-1. "Robust Control of Engine Test Bed for Vehicle Motion Simulation," Transactions of the Japan Society of Mechanical Engineers Series C, Volume 67, Issue 653

DISCLOSURE OF THE INVENTION

Problems to be Solved by the Invention

However, in the case of designing a controller which causes the control output of a control target to follow a certain command value by a controller design method based on the aforementioned such generalized plant, a control amount output port is set which outputs a value obtained by weighting the deviation between the command value and the signal trying to follow this command value in the generalized plant by a weighting function including an integral property (for example, refer to weighting function Ws in Non-patent Document 1). However, as explained by referencing FIG. 7 later, the gain of the integrator included in the controller designed based on such a generalized plant generally does not match with the gain of the weighting function defined in the generalized plant. In other words, with the conventional controller design method based on a generalized plant, it is not possible to designate at the design stage the value of integral gain of the controller ultimately obtained.

However, the response performance of a controller is mostly determined by the value of the integral gain. For this reason, in the aforementioned such controller design method, there are cases where it is sought to configure so as to be able to designate at the design stage the value of integral gain of the controller ultimately obtained.

In addition, for example, Patent Document 1 by the present applicants shows an electric inertia control device configured by combining an existing shaft torque controller and a low-pass filter; however, with the electric inertia control device shown in Patent Document 1, it is necessary to teach the value of a plurality of control parameters (a1, a2, b1, etc.) using the value of the integral gain of the shaft torque controller. Therefore, also in the case of designing the shaft torque controller incorporated into such an electric inertia control device, it has been sought to configure so as to be able to designate at the design stage the value of the integral gain of the shaft torque controller ultimately obtained.

The present invention has an object of providing a design method of a shaft torque controller of a test system or a general feedback controller based on a generalized plant, the design method being able to bring the integral gain of these controllers close to the designated value, and a shaft torque controller designed using this design method.

Means for Solving the Problems

A design method according to a first aspect of the present invention relates to a method for designing a shaft torque controller (for example, the shaft torque controller 5 described later), which defines as a control target a test system (for example, the test system 1 described later) including: a dynamometer (for example, the input-side dynamometer 21 described later) coupled to a shaft (for example, the input shaft SI described later) of a test piece (for example, the test piece W described later); an inverter (for example, the input-side inverter 23 described later) which supplies electric power according to a torque current command signal to the dynamometer; and a shaft torque detector (for example, the input-side shaft torque meter 25 described later) which generates a shaft torque detection signal according to a shaft torque between the dynamometer and the test piece, the shaft torque controller generating the torque current command signal so as to suppress deviation between a shaft torque command signal for the shaft torque and the shaft torque detection signal. The shaft torque controller includes: an integrator (for example, the integrator 52 described later) which integrates deviation between the shaft torque command signal and the shaft torque detection signal, and calculates a first input by multiplying integral gain (for example, the integral gain Ki described later) of a designated value; a non-integrator (for example, the non-integrator 53 described later) which calculates a second input based on the shaft torque detection signal; and a torque current command generator (for example, the torque current command generator 54 described later) which generates the torque current command signal based on the first input and the second input, and inputs to the inverter. The design method includes: a design step (for example, S1 and S2 in FIG. 6 described later) of designing the controller (for example, the p controller K described later) such that satisfies a predetermined design condition using a computer, in a feedback control system (for example, the feedback control system 8 described later) including: a generalized plant (for example, the generalized plant P described later) including a nominal plant (for example, the nominal plant N described later) imitating an input/output characteristic from the torque current command signal of the control target until the shaft torque detection signal; and a controller which gives an input to the generalized plant based on output of the generalized plant; and an implementation step (for example, S3 in FIG. 6 described later) of implementing the controller in the shaft torque controller as the non-integrator. The design step sets in the generalized plant: a first disturbance input port (for example, the first disturbance input port 81 described later) in which a first disturbance input (for example, the first disturbance input w1 described later) corresponding to the shaft torque command signal is inputted; an integration operation amount calculation unit (for example, the integration operation amount calculation unit 90 described later) which integrates a deviation input between the first disturbance input and output of the nominal plant, and calculates an integration operation amount by multiplying integral gain of the designated value; a summing unit (for example, the summing unit 91 described later) which sums output obtained by the controller by inputting output of the nominal plant to the controller, and the integration operation amount, and generates input to the nominal plant; a first control amount output port (for example, the first control amount output port 84 described later) which outputs a value obtained by multiplying a predetermined first output weighting function (for example, the first output weighting function Ge(s) described later) by the deviation input as a first control amount output (for example, the first control amount output z1 described later); and a second control amount output port (for example, the second control amount output port 85 described later) which outputs a value obtained by multiplying a predetermined second output weighting function (for example, the second output weighting function Gip(s) described later) by output of the controller as a second control amount output (for example, the second control amount output z2 described later).

According to a second aspect of the present invention, in this case, it is preferable for the first and second output weighting functions to include an integral characteristic.

According to a third aspect of the present invention, in this case, it is preferable for the design step to further set in the generalized plant a second disturbance input port (for example, the second disturbance input port 82 described later) in which a second disturbance input (for example, the second disturbance input w2 described later) corresponding to torque control error of the dynamometer is inputted, and to input a sum of output of the controller, the integration operation amount, and a value obtained by multiplying a predetermined second input weighting function (for example, the second input weighting function Gid(s) described later) by the second disturbance input, to the nominal plant.

According to a fourth aspect of the present invention, in this case, it is preferable for the design step to further set in the generalized plant a third disturbance input port (for example, the third disturbance input port 83 described later) in which a third disturbance input (for example, the third disturbance input w3 described later) corresponding to torque detection error by the shaft torque detection is inputted, and to input, to the integration operation amount calculation unit, a value obtained by subtracting a sum of output of the nominal plant and a value obtained by multiplying a predetermined third input weighting function (for example, the third input weighting function Gn(s) described later) by the third disturbance input, from a value obtained by multiplying a predetermined first input weighting function (for example, the first input weighting function Gr(s) described later) by the first disturbance input.

According to a fifth aspect of the present invention, in this case, it is preferable for the design step to further set in the generalized plant a third control amount output port (for example, the third control amount output port 86 described later) which outputs a value obtained by multiplying a predetermined third output weighting function (for example, the third output weighting function Gt(s) described later) by output of the nominal plant, as a third control amount output (for example, the third control amount output z3 described later), and to set the third output weighting function so as to be a larger weighting in a frequency band including a torsional resonance frequency between the dynamometer and the test piece, than in another frequency band.

A design method according to a sixth aspect of the present invention relates to a method for designing a feedback controller (for example, the shaft torque controller 5 described later) that includes: an integrator (for example, the integrator 52 described later) which integrates deviation between a control output of a control target (for example, the test system 1 described later) and a command for the control output, and calculates a first input by multiplying an integral gain (for example, the integral gain Ki described later) of a designated value; a non-integrator (for example, the non-integrator 53 described later) which calculates a second input based on the control output; and a control input generator (for example, the torque current command generator 54 described later) which generates the control input based on the first input and the second input, and inputs to the control target. The design method includes: a design step (for example, S1 and S2 in FIG. 6 described later) of designing the controller (for example, the p controller K described later) such that satisfies a predetermined design condition using a computer, in a feedback control system including: a generalized plant (for example, the generalized plant P described later) including a nominal plant (for example, the nominal plant N described later) imitating an input/output characteristic from the control input of the control target until the control output; and a controller which gives an input to the generalized plant based on output of the generalized plant; and an implementation step (for example, S3 in FIG. 6 described later) of implementing the controller in the feedback controller as the non-integrator. The design step sets in the generalized plant: a first disturbance input port (for example, the first disturbance input port 81 described later) in which a first disturbance input (for example, the first disturbance input w1 described later) corresponding to the command; an integration operation amount calculation unit (for example, the integration operation amount calculation unit 90 described later) which integrates a deviation input between the first disturbance input and output of the nominal plant, and calculates an integration operation amount by multiplying integral gain of the designated value; a summing unit (for example, the summing unit 91 described later) which sums output obtained by the controller by inputting output of the nominal plant to the controller, and the integration operation amount, and generates input to the nominal plant; a first control amount output port (for example, the first control amount output port 84 described later) which outputs a value obtained by multiplying a predetermined first output weighting function (for example, the first output weighting function Ge(s) described later) by the deviation input as a first control amount output (for example, the first control amount output z1 described later); and a second control amount output port (for example, the second control amount output port 85 described later) which outputs a value obtained by multiplying a predetermined second output weighting function (for example, the second output weighting function Gip(s) described later) by output of the controller as a second control amount output (for example, the second control amount output z2 described later).

A shaft torque controller (for example, the shaft torque controller 5 described later) according to a seventh aspect of the present invention establishes, as a control target, a test system (for example, the test system 1 described later) including a dynamometer (for example, the input-side dynamometer 21 described later) coupled to a shaft (for example, the input shaft SI described later) of a test piece (for example, the test piece W described later), an inverter (for example, the input-side inverter 23 described later) which supplies electric power according to a torque current command signal to the dynamometer, and a shaft torque detector (for example, the input-side shaft torque meter 25 described later) which generates a shaft torque detection signal according to shaft torque between the dynamometer and the test piece, the shaft torque controller generating the torque current command signal so as to suppress deviation between shaft torque command signal for the shaft torque and the shaft torque detection signal. The shaft torque controller includes an integrator (for example, the integrator 52 described later) which integrates deviation between the shaft torque command signal and the shaft torque detection signal, and calculates a first input by multiplying integral gain (for example, the integral gain Ki described later) of a designated value; and a non-integrator (for example, the non-integrator 53 described later) which calculates a second input based on the shaft torque detection signal, and generates the torque current command signal by summing the first input and the second input; and the non-integrator includes the controller designed using a computer so as to satisfy a predetermined design condition, in a feedback control system (for example, the feedback control system 8 described later) including: a generalized plant (for example, the generalized plant P described later) a nominal plant (for example, the nominal plant N described later) imitating input/output characteristics from the torque current command signal of the control torque until the shaft torque detection signal, and a controller (for example, the p controller K described later) which gives an input to the generalized plant based on output of the generalized plant. The generalized plant includes: a first disturbance input port (for example, the first disturbance input port 81 described later) in which a first disturbance input (for example, the first disturbance input w1 described later) corresponding to the shaft torque command signal is inputted; an integration operation amount calculation unit (for example, the integration operation amount calculation unit 90 described later) which integrates a deviation input between the first disturbance input and output of the nominal plant, and calculates an integration operation amount by multiplying integral gain of the designated value; a summing unit (for example, the summing unit 91 described later) which sums output obtained by the controller by inputting output of the nominal plant to the controller, and the integration operation amount, and generates input to the nominal plant; a first control amount output port (for example, the first control amount output port 84 described later) which outputs a value obtained by multiplying a predetermined first output weighting function (for example, the first output weighting function Ge(s) described later) by the deviation input as a first control amount output (for example, the first control amount output z1 described later); and a second control amount output port (for example, the second control amount output port 85 described later) which outputs a value obtained by multiplying a predetermined second output weighting function (for example, the second output weighting function Gip(s) described later) by output of the controller as a second control amount output (for example, the second control amount output z2 described later).

Effects of the Invention

The first aspect of the present invention relates to a design method for a shaft torque controller establishing, as the control target, a test system including a dynamometer, inverter and shaft torque detector. This shaft torque controller includes: an integrator which integrates the deviation between the shaft torque command signal and the shaft torque detection signal, and calculates the first input by multiplying the integral gain of a predetermined designated value; the non-integrator which calculates the second input based on the shaft torque detection signal; and the torque current command generator which generates the torque current command signal based on these first and second inputs. In addition, the present invention designs the shaft torque controller through a design step of designing, using a computer, the controller such that satisfies predetermined design condition, in the feedback control system including the generalized plant including the nominal plant imitating the input/output characteristics of the control target, and the controller; and the implementation step of implementing the controller obtained through this design step as the non-integrator in the shaft torque controller. In this way, the shaft torque controller includes the integrator which performs an integration operation under the integral gain of a designated value; however, when designing the non-integrator by the design method based on a conventional generalized plant, the integral gain of the integral element in the overall shaft torque controller combining the integrator and non-integrator may diverse from the above-mentioned designated value. Therefore, the design method of the present invention sets in the generalized plant: the first disturbance input port in which the first disturbance input corresponding to the shaft torque command signal is inputted; the integration operation amount calculation unit which integrates the deviation input between the first disturbance input and output of the nominal plant, and calculates an integration operation amount by multiplying integral gain of the above-mentioned designated value; the summing unit which sums the output obtained by this controller by inputting the output of the nominal plant to the controller, and the integration operation amount, and generates the input to the nominal plant; the first control amount output port which outputs a value obtained by multiplying the predetermined first output weighting function by the deviation input, as the first control amount output; and the second control amount output port which outputs a value obtained by multiplying the predetermined second output weighting function by the output of the controller as the second control amount output. In this way, since the present invention can configure so as not to include an integral element in the non-integrator to the upmost, by incorporating in advance the integration operation amount calculation unit corresponding to the integrator of the shaft torque controller in the generalized plant at the design stage, it is possible to bring the integral gain of the integral element in the overall shaft torque controller close to the designated value.

The design method according to the second aspect of the present invention respectively imparts integral characteristics to the first output weighting function which multiplies by the deviation input to the integration operation amount calculation unit (corresponding to integrator in the shaft torque controller) in the generalized plant; and the second output weighting function which multiplies by the output of the controller (corresponding to the non-integrator in the shaft torque controller) in the generalized plant.
it is possible to bring the integral gain of the integral element in the overall shaft torque controller close to the designated value.

The design method according to the third aspect of the present invention sets, in the generalized plant, the second disturbance input port in which the second disturbance input corresponding to the torque control error of the dynamometer is input, and inputs to the nominal plant the sum of the output of the controller, the integration operation amount, and a value obtained by multiplying the predetermined second input weighting function by the above-mentioned second disturbance input. It is thereby possible to design a shaft torque controller which brings the integral gain of the integral element close to the designated value, and has high robustness relative to torque control error of the dynamometer.

The design method according to the fourth aspect of the present invention sets in the generalized plant the third disturbance input port in which the third disturbance input corresponding to the torque detection error by the shaft torque detector is inputted, and inputs to the integration operation amount calculation unit a value obtained by subtracting the sum of the output of the nominal plant and a value obtained by multiplying the third input weighting function by the third disturbance input, from a value obtained by multiplying the first input weighting function by the first disturbance input. It is thereby possible to design a shaft torque controller which brings the integral gain of the integral element close to the designated value, and has high robustness relative to torque detection error of the shaft torque detector.

The design method according to the fifth aspect of the present invention sets the third control amount output portion which outputs to the generalized plant a value obtained by multiplying the third output weighting function by the output of the nominal plant as the third control amount output, and designs this third output weighting function so as to be larger weighting in a frequency band including the torsional resonance frequency between the dynamometer and the test piece, than in other frequency bands. It is thereby possible to design a shaft torque controller which brings the integral gain of the integral element close to the designated value, and includes a function of suppressing torsional resonance between the dynamometer and the test piece.

The sixth aspect of the present invention relates to a design method for a feedback controller which includes: the integrator which integrates deviation between the control output of the control target and the command for this control output, and calculates the first input by multiplying the integral gain of a designated value; the non-integrator which calculates the second input based on the control output; and the control input generator which generates the control input based on the first and second inputs, and inputs this to the control target. In addition, the present invention designs the feedback controller through the design step of designing, using a computer, the controller such that satisfies the predetermined design condition, in the feedback control system which includes the generalized plant including the nominal plant imitating the input/output characteristics of the control target; and the implementation step of implementing the controller obtained through this design step in the feedback controller as the non-integrator. In this way, the feedback controller includes the integrator which performs an integration operation under the integral gain of a designated value; however, when designing the non-integrator by the design method based on a conventional generalized plant, the integral gain of the integral element in the overall feedback controller combining the integrator and non-integrator may diverse from the above-mentioned designated value. Therefore, the design method of the present invention sets in the generalized plant: the first disturbance input port in which the first disturbance input corresponding to the s command is inputted; the integration operation amount calculation unit which integrates the deviation input between the first disturbance input and output of the nominal plant, and calculates an integration operation amount by multiplying integral gain of the above-mentioned designated value, the integration operation amount calculation unit calculating the integration operation amount by inputting the output of the nominal plant to the controller; the summing unit which sums the output obtained by this integrator by inputting the output of the nominal plant to the controller, and the integration operation amount, and generates the input to the nominal plant; the first control amount output port which outputs a value obtained by multiplying the predetermined first output weighting function by the deviation input, as the first control amount output; and the second control amount output port which outputs a value obtained by multiplying the predetermined second output weighting function by the output of the controller as the second control amount output. In this way, since the present invention can configure so as not to include an integral element in the non-integrator to the upmost, by incorporating in advance the integration operation amount calculation unit corresponding to the integrator of the feedback controller in the generalized plant at the design stage, it is possible to bring the integral gain of the integral element in the overall feedback controller close to the designated value.

The shaft torque controller of the test system according to the seventh aspect of the present invention includes the non-integrator designed using the generalized plant according to the design method of the first aspect. Consequently, according to the present invention, since it is possible to configure so as not to include an integral element in the non-integrator to the upmost, it is possible to bring the integral gain of the integral element in the overall shaft torque controller close to the designated value.

PREFERRED MODE FOR CARRYING OUT THE INVENTION

Figure 1:
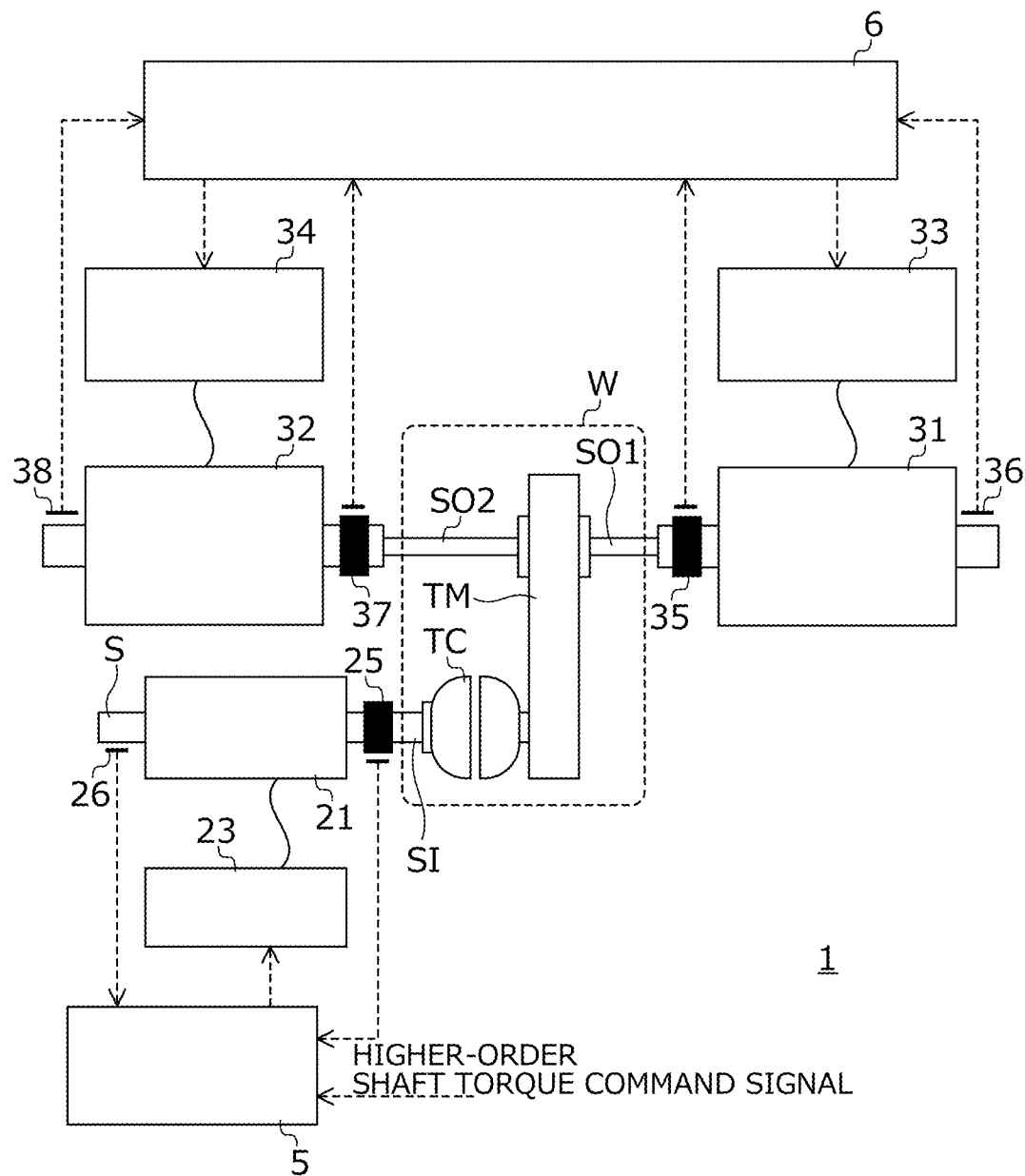
FIG. 1 is a view showing the configuration of a test system of a drive train to which the shaft torque controller according to an embodiment of the present invention is applied.

Hereinafter, an embodiment of the present invention will be explained in detail while referencing the drawings. FIG. 1 is a view showing the configuration of a test system 1 of a drive train equipped with a shaft torque controller 5 according to the present embodiment. It should be noted that FIG. 1 shows an example of the test system 1 which uses a drive train of a vehicle of FF drive type as a test piece W, and evaluates performance of this test piece W; however, the present invention is not limited thereto. The test piece W may be established as a drivetrain of a vehicle of FR drive type, for example.

The test piece W is the drivetrain for a vehicle, and includes: an input shaft SI to which an engine (not shown) is connected in a state equipped to a completed car; left/right output shafts SO1, SO2 which are drive shafts; a torque converter TC which amplifies dynamic force inputted to the input shaft SI and transfers to the output shafts SO1, SO2; and a transmission TM which changes the speed of dynamic force inputted to the input shaft SI, and transfers to the output shafts SO1, SO2.

The test system 1 includes: an input-side dynamometer 21, an input-side inverter 23, an input-side shaft torque meter 25, an input-side encoder 26 and a shaft torque controller 5 which are provided to a side of the input shaft SI of the test piece W; and a first output-side dynamometer 31, second output-side dynamometer 32, first output-side inverter 33, second output-side inverter 34, first output-side shaft torque meter 35, first output-side encoder 36, second output-side shaft torque meter 37, second output-side encoder 38 and output-side control device 6 which are provided to the side of the output shafts SO1, SO2 of the test piece W.

A leading end side of the output shaft S of the input-side dynamometer 21 is connected to the input shaft SI of the test piece W. The input-side inverter 23, when an input-side torque current command signal generated in the shaft torque control device 5 is inputted, provides electric power according to this input-side torque current command signal to the input-side dynamometer 21. The input-side dynamometer 21 thereby generates torque according to the input-side torque current command signal.

The input-side shaft torque meter 25 generates an input-side shaft torque detection signal according to the shaft torque between the output shaft S of the input-side dynamometer 21 and the input shaft SI of the test piece W, and inputs this to the shaft torque controller 5. The input-side encoder 26 detects the rotational speed (rotation number per unit time of shaft) of the output shaft S of the input-side dynamometer 21, generates an input-side speed detection signal according to this rotational speed, and inputs this to the shaft torque controller 5.

The shaft torque controller 5 is a feedback controller which generates an input-side torque current command signal, based on the input-side shaft torque detection signal by the input-side shaft torque meter 25 and a higher-order shaft torque command signal corresponding to the command signal for the shaft torque detected by the input-side shaft torque meter 25, and inputs this input-side torque current command signal to the input-side inverter 23. It should be noted that the higher order shaft torque command signal is generated in a higher order controller (not shown) according to the contents of the test on the test piece W. The shaft torque controller 5 causes drive torque simulating the engine of a completed car to which the test piece W is installed to be generated in the input-side dynamometer 21, and drives the input shaft SI of the test piece W.

The shaft torque controller 5 at least includes both functions of a shaft torque deviation suppressing function of generating the input-side torque current command signal so as to suppress the shaft torque deviation (higher order shaft torque command signal—input-side shaft torque detection signal) between the higher order shaft torque command signal and input-side shaft torque detection signal; and a resonance suppressing function of suppressing torsional resonance between the output shaft S and input shaft SI. As the shaft torque controller 5 including this shaft torque deviation suppressing function and resonance suppressing function, one designed according to the sequence explained by referencing FIGS. 2 to 6, etc. later can be used.

The output shaft of the first output-side dynamometer 31 is connected to the output shaft SO1 of the test piece W. The first output-side inverter 33, when the first output-side torque current command signal generated by the output-side control device 6 is inputted, provides electric power according to this first output-side torque current command signal to the first output-side dynamometer 31. The first output-side dynamometer 31 thereby generates torque according to the first output-side torque current command signal. The first output-side shaft torque meter 35 generates a first output-side shaft torque detection signal according to the shaft torque between the output shaft of the first output-side dynamometer 31 and the output shaft SO1 of the test piece W, and inputs this to the output-side control device 6. The first output-side encoder 36 detects the rotational speed of the output shaft of the first output-side dynamometer 31, generates a first output-side speed detection signal according to this rotational speed, and inputs this to the output-side control device 6.

The output shaft of the second output-side dynamometer 32 is connected to the output shaft SO2 of the test piece W. The second output-side inverter 34, when the second output-side torque current command signal generated by the output-side control device 6 is inputted, supplies electric power according to this second output-side torque current command signal to the second output-side dynamometer 32. The second output-side dynamometer 32 thereby generates torque according to the second output-side torque current command signal. The second output-side shaft torque meter 37 generates a second output-side shaft torque detection signal according to the shaft torque between the output shaft of the second output-side dynamometer 32 and the output shaft SO2 of the test piece W, and inputs this to the output-side control device 6. The second output-side encoder 38 detects the rotational speed of the output shaft of the second output-side dynamometer 32, generates a second output-side speed detection signal according to this rotational speed, and inputs this to the output-side control device 6.

The output-side control device 6 generates the first output-side torque current command signal and second output-side torque current command signal, by using input signals such as the first output-side shaft torque detection signal by the first output-side shaft torque meter 35, first output-side speed detection signal by the first output-side encoder 36, the second output-side shaft torque detection signal by the second output-side shaft torque meter 37, and the second output-side speed detection signal by the second output-side encoder 38, and inputs these to the first output-side inverter 33 and second output-side inverter 34. The output-side control device 6 thereby grants a load imitating the tire inertia and vehicle body inertia of the completed vehicle to which the test piece W is equipped, and the load according to another test piece W via the first output-side dynamometer 31 and second output-side dynamometer 32 to the output shafts SO1 and SO2.

The test system 1 evaluates the durability performance, quality, etc. of the test piece W under a state close to the traveling state of an actual vehicle, by giving the load imitating the tire inertia and vehicle body inertia and load according to another test piece W to the output shafts SO1, SO2 of the test piece W by the output-side control device 6, simultaneously with driving the input shaft SI of the test piece W by the shaft torque controller 5.

Next, a sequence of designing a shaft torque controller 5 equipped with the above such shaft torque deviation suppressing function and resonance suppressing function will be explained while referencing the drawings. It should be noted that, hereinafter, due to explaining by focusing on the configuration on the side of the input shaft SI of the test piece W in the test system 1, the input-side dynamometer 21 is referred to simply as dynamometer 21, the input-side inverter 23 is referred to simply as inverter 23, the input-side shaft torque meter 25 is referred to simply as shaft torque meter 25, the input-side shaft torque detection signal is referred to simply as shaft torque detection signal, the input-side encoder 26 is referred to simply as encoder 26, the input-side speed detection signal is referred to simply as speed detection signal, and the input-side torque current command signal is referred to simply as torque current command signal.

Figure 2:
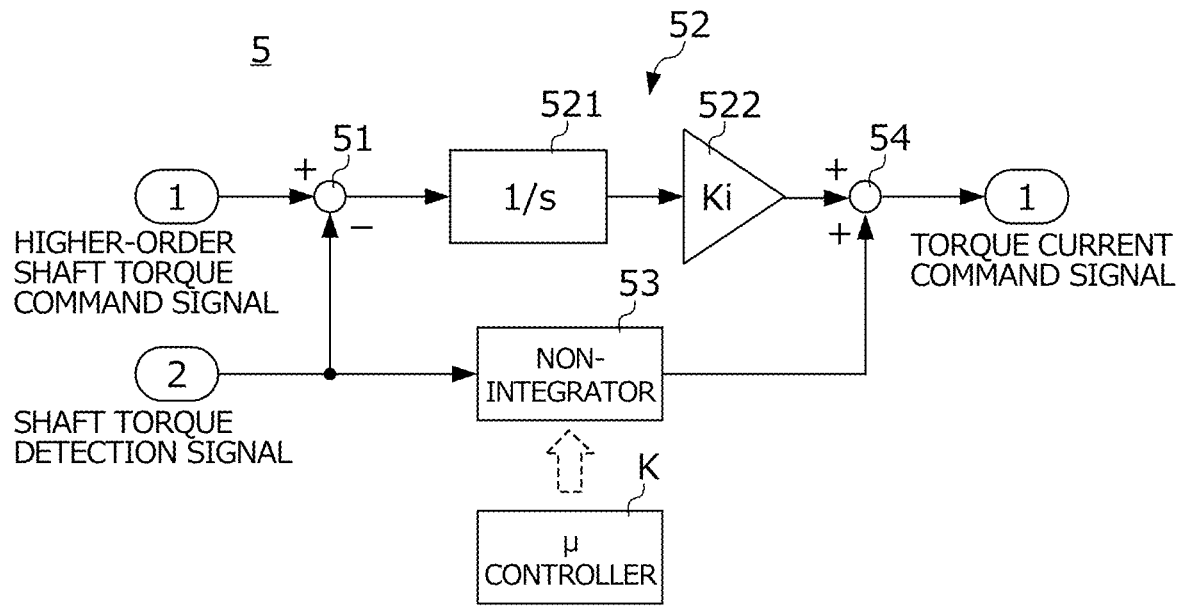
FIG. 2 is a view showing the configuration of a control circuit of the shaft torque controller.

FIG. 2 is a view showing the configuration of a control circuit of the shaft torque controller 5. The shaft torque controller 5 includes: a deviation operation part 51 which calculates the deviation between a higher-order shaft torque command signal and shaft torque detection signal; an integrator which calculates a first input based on the deviation calculated by the deviation operation part 51; a non-integrator 53 which calculates a second input based on the shaft torque detection signal; and a torque current command generator 54 which generates a torque current command signal based on the first and second inputs, and inputs to the inverter 23.

The deviation operation part 51 calculates deviation by subtracting the shaft torque detection signal from the higher-order torque command signal. The integrator 52 includes: an integration operation part 521 which integrates the deviation; and an integral gain multiplying part 522 which calculates the first input by multiplying the integral gain Ki of a designated value by the output of this integration operation part 521. As the non-integrator 52, the p controller K designed in accordance with the sequence explained by referencing FIGS. 3 to 6, etc. later can be used. The torque current command generator 54 generates a torque current command signal by summing the first input and the second input. The shaft torque controller 5 is configured by implementing the deviation operation part 51, integrator 52 and non-integrator 53 and torque current command generation unit 54 including the above such functions, to hardware including input/output ports of a digital signal processor, microcomputer or the like in a combination such as that shown in the circuit diagram of FIG. 2.

In addition, in the test system 1 configured in the above way, when the higher-order shaft torque command signal sent from a higher-order controller (not shown) via communication, and the shaft torque detection signal sent from the shaft torque meter 25 are inputted, the shaft torque controller 5 to which the p controller K described later was implemented generates the torque current command signal, and inputs this to the inverter 23 via communication. The inverter 23 electrically connected with the dynamometer 21, when the torque current command signal is inputted from the shaft torque controller 5 is inputted, causes torque according to this torque current command signal to be generated in the dynamometer 21. It should be noted that, as disturbance element assumed at this time, there is a nonlinear shift between the torque current command signal and the generated torque in the dynamometer 21 due to noise generating upon measuring the shaft torque in the shaft torque meter 25, delay in time of each communication path, control response of the inverter 23, etc. It should be noted that, the aforementioned higher-order shaft torque command signal may be generated by a higher-order controller separate from the shaft torque controller 5 as mentioned above, or may be generated by a module constructed separately from the p control K inside of the shaft torque controller 5.

Figure 3:
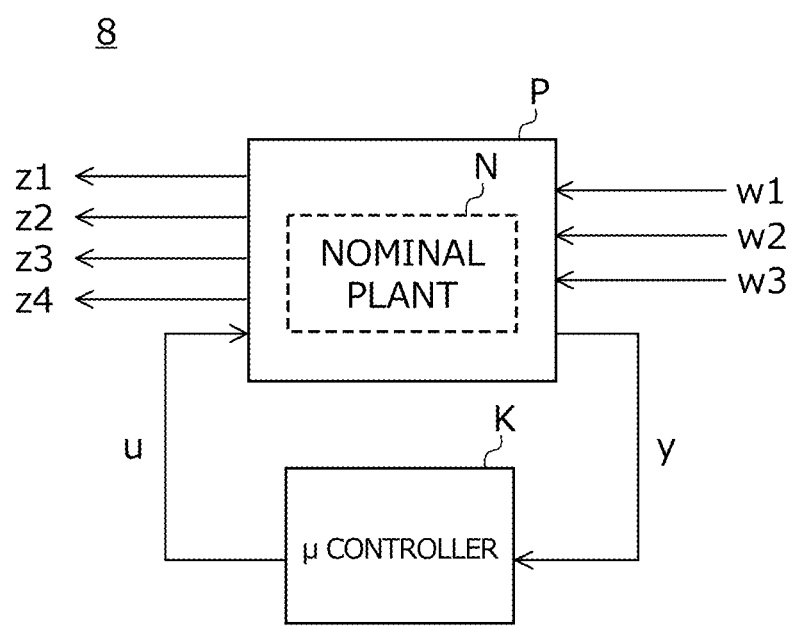
FIG. 3 is a view showing the configuration of a feedback control system used upon designing a shaft torque controller.

FIG. 3 is a view showing the configuration of a feedback control system 8 used upon designating the non-integrator 53 of the shaft torque controller 5. The feedback controller system of FIG. 3 is configured by combining the generalized plant P including the nominal plant N imitating the input/output characteristic of the test system 1, and the p controller K giving an input to this generalized plant P based on the output of this generalized plant P.

The generalized plant P defines inputs configured by a first disturbance input w1, second disturbance input w2 and third disturbance input w3, and outputs configured by a first control amount output z1, second control amount output z2, third control amount output z3 and fourth control amount output z4. In addition, between the generalized plant P and p controller K, an observation output y corresponding to the shaft torque detection signal and a control input u corresponding to the torque current command signal are defined.

Figure 4:
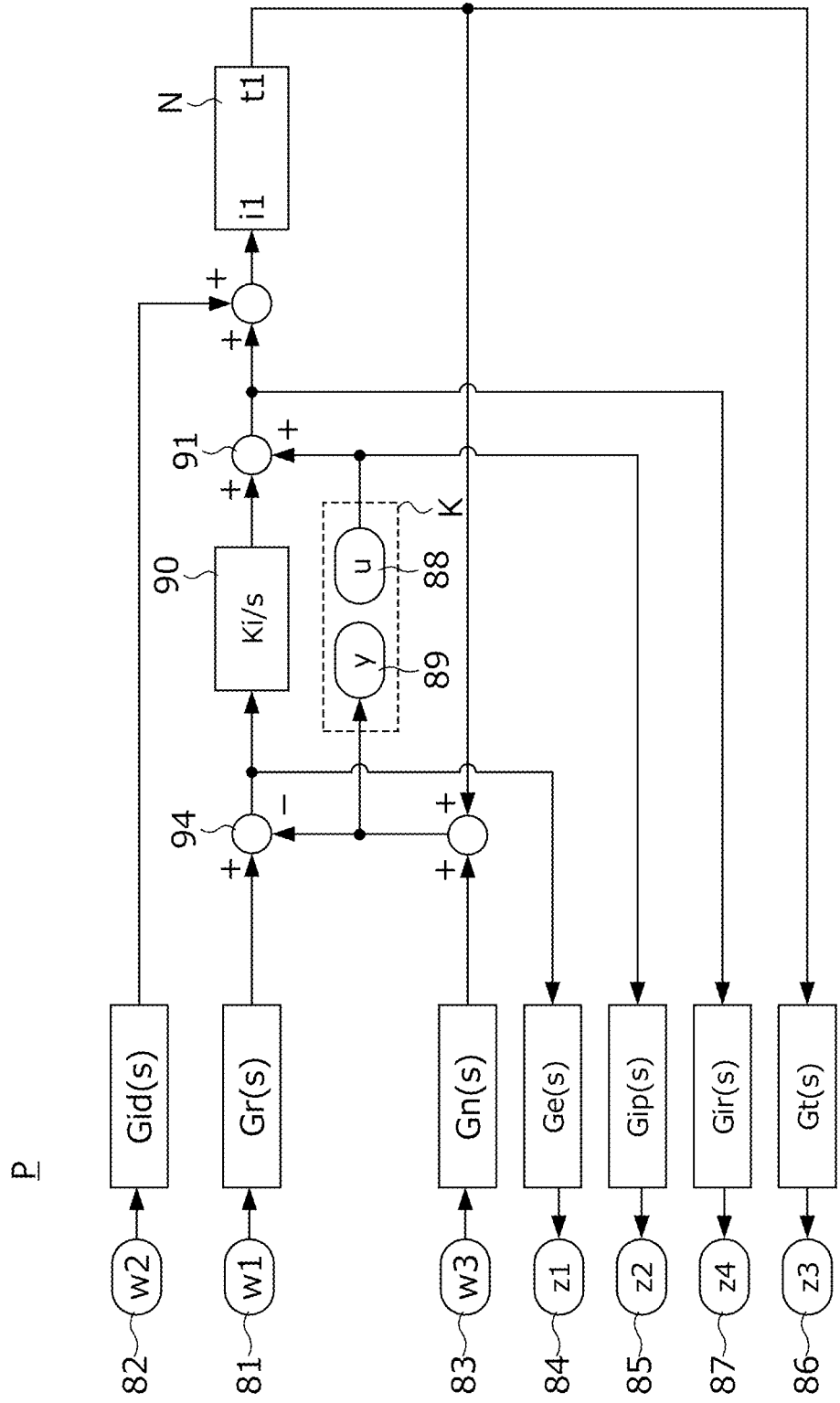
FIG. 4 is a view showing the configuration of a generalized plant used upon designing a non-integrator of a shaft torque controller.

FIG. 4 is a view showing the configuration of the generalized plant P used upon designing the non-integrator 53. The generalized plant P includes: a first disturbance input port 81 to which the first disturbance input w1 is inputted; a second disturbance input port 82 to which the second disturbance input w2 is inputted; a third disturbance input port 83 to which the third disturbance input w3 is inputted; a first control amount output port 84 which outputs the first control amount output z1; a second control amount output port 85 which outputs the second control amount output z2; a third control amount output port 86 which outputs the third control amount output z3; a fourth control amount output port 87 which outputs the fourth control amount output z4; a control input port 88 to which the control input u is inputted; an observation output port 89 which outputs the observation output y; the nominal plant N imitating the input/output characteristics of the test system 1 which is the control target; an integration operation amount calculation unit 90 imitating the input/output characteristics of the integrator 52 of the shaft torque controller 5; an summing unit 91 imitating the input/output characteristics of the torque current command generator 54 of the shaft torque controller 5; a subtracting unit 94 imitating the input/output characteristics of the deviation operation part 51 of the shaft torque controller 5; and a plurality of weighting functions Gid(s), Gr(s), Gn(s), Ge(s), Gip(s), Gir(s) and Gt(s).

The nominal plant N includes input/output characteristics imitating the characteristics from the dynamo torque i1 which is one of the inputs of the test system 1 explained by referencing FIG. 1, until the transmitted torque t1 which is one of the outputs of the test system 1.

The dynamo torque t1 corresponds to the torque generated in the dynamometer 21, based on the torque current command signal inputted to the inverter 23, in the test system 1. The transmitted torque t1 corresponds to the torque transmitted to the input shaft SI of the test piece W from the output shaft S of the dynamometer 21 in the test system 1, i.e. shaft torque between the output shaft S and input shaft SI. It should be noted that this transmitted torque t1 is detected by the shaft torque meter 25 in the test system 1.

Figure 5:
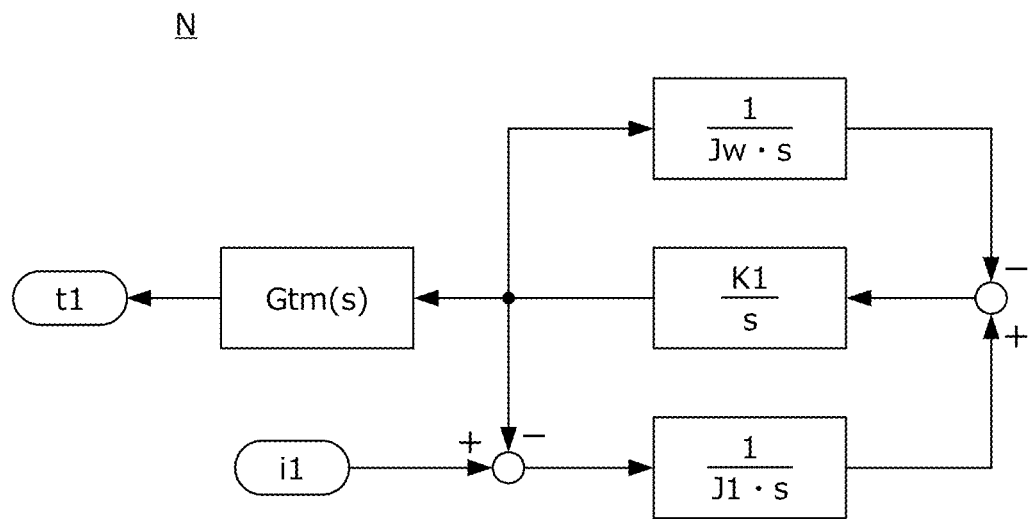
FIG. 5 is a view showing the configuration of a nominal plant.

FIG. 5 is a view showing the configuration of the nominal plant N. As shown in FIG. 5, the nominal plant N is constructed based on the equations of motion of a two-inertia system (refer to Formulas (1-1) to (1-3) below), configured by coupling two inertia bodies having a test piece inertial moment Jw and a dynamo inertial moment J1 in series by an axial body having torsional rigidity K1. It should be noted that the present embodiment explains a case ignoring the test piece torque inputted to the test piece W via the output shafts SO1, SO2 by the output-side dynamometers 31, 32 in the test system 1; however, the present invention is not limited thereto.

$$\omega_w = \frac{1}{Jw \cdot s} \cdot \frac{K1}{s}(\omega_1 - \omega_w) \quad (1\text{-}1)$$

$$t1 = Gtm(s) \cdot \frac{K1}{s}(\omega_1 - \omega_w) \quad (1\text{-}2)$$

$$\omega_1 = \frac{1}{J1 \cdot s}\left\{i1 - \frac{K1}{s}(\omega_1 - \omega_w)\right\} \quad (1\text{-}3)$$

In FIG. 5 and the following explanation, "s" is the Laplace operator. The test piece inertial moment Jw corresponds to the inertial moment of the test piece W in the test system 1. The dynamo inertial moment J1 corresponds to the inertial moment of the dynamometer 21 in the test system 1. The torsional rigidity K1 corresponds to the torsional rigidity of a device coupling the test piece W and dynamometer 21 in the test system 1. In addition, the transfer function Gtm(s) in FIG. 5 corresponds to the response characteristic of the shaft torque meter 25 in the test system 1. In addition, "ω1" in the above Formulas (1-1) to (1-3) corresponds to the rotational speed of the output shaft S of the dynamometer 21, and "ωw" corresponds to the rotational speed of the input shaft SI of the test piece W.

The nominal plant N generates the transmitted torque t1, based on the dynamo torque i1, by using an equation of motion such as that shown in FIG. 5 and the above Formulas (1-1) to (1-3).

Referring back to FIG. 4, in the generalized plant P, a plurality of input/output signals consisting of the first disturbance input w1, second disturbance input w2, third disturbance input w3, first control amount output z1, second control amount output z2, third control amount output z3, fourth control amount output z4, control input u, and the observation output y are defined. The corresponding relationship between these input/output signals and the test system 1 of FIG. 1 are as follows.

The second disturbance input w2 is an input signal inputted to the generalized plant P via the second disturbance input port 82. The second disturbance input w2 is a disturbance input corresponding to the torque control error (disagreement between torque current command signal and dynamo torque i1) between the inverter 23 and dynamometer 21 in the test system 1. In the generalized plant P, the influence from torque control error is evaluated by inputting such a second disturbance input w2 to the second disturbance input port 82. In the generalized plant P, the signal obtained by summing the signal weighting the second disturbance input w2 by the second input weighting function Gid(s) and the output signal of an adder part 91 described later is inputted to the nominal plant N as the dynamo torque i1. This second input weighting function Gid(s) is set according to the frequency characteristic of torque control error in the inverter 23 and dynamometer 21. Since there is an upper limit in the control response of the inverter 23, there is a characteristic of the torque control error increasing in the high frequency band. Therefore, the second input weighting function Gid(s) is set so as to be larger weighting in a high frequency band in which there is a trend for the torque control error to increase, than in the low frequency band.

The third disturbance input w3 is an input signal inputted to the generalized plant P via the third disturbance input port 83. The third disturbance input w3 is a disturbance input corresponding to the torque detection error (disagreement between shaft torque detection signal and transmitted torque t1) by the shaft torque meter 25 in the test system 1. In the generalized plant P, the influence by the torque detection error is evaluated by inputting such a third disturbance input w3 to the third disturbance input port 83. In the generalized plant P, a signal obtained by adding a signal obtained by weighting the third disturbance input w3 by the third input weighting function Gn(s) and the transmitted torque t1 outputted from the nominal plant N is outputted from the observation output port 89 as the observation output y. This third disturbance input w3 is set according to the frequency characteristic of the torque detection error by the shaft torque meter 25. More specifically, in the high frequency band in which there is a trend for the torque detection error to increase, it is set so as to be larger weighting than in the low frequency band in which there is trend for the torque detection error to become small.

The first disturbance input w1 is an input signal inputted to the generalized plant P via the first disturbance input port 81. The first disturbance input w1 is a disturbance input corresponding to a higher-order shaft torque command signal in the test system 1. In the generalized plant P, the influence from the higher-order shaft torque command signal is evaluated by inputting such a first disturbance input w1 to the first disturbance input port 81. In the generalized plant P, a signal obtained by weighting the first disturbance input w1 by the first input weighting function Gr(s) is inputted to the subtracting unit 94 described later. This first input weighting function Gr(s) is set to a constant, for example.

The observation output y is a signal outputted from the generalized plant P to the observation output port 89, and inputted to the p controller K, and corresponds to the shaft torque detection signal inputted to the non-integrator 53 in the shaft torque controller 5 of the test system 1. This observation output y is calculated by adding a value obtained by weighting the third disturbance input w3 by the third input weighting function Gn(s) as mentioned above, and the transmitted torque t1 outputted from the nominal plant N.

The control input u is a signal outputted from the p controller K and inputted to the generalized plant P via the control input port 88, and corresponds to the second input outputted from the non-integrator 53 in the shaft torque controller 5 of the test system 1. In the generalized plant P, the control input u inputted via the control input port 88 is inputted to the summing unit 91 described later.

The subtracting unit 94 corresponds to the deviation operation part 51 in the shaft torque controller 5. The subtracting unit 94 calculates the deviation input by subtracting the observation output y from a signal obtained by weighting the first disturbance input w1 by the first input weighing function Gr(s), and inputs to the integration operation amount calculation unit 90.

The integration operation amount calculation unit 90 corresponds to the integrator 52 in the shaft torque controller 5. The integration operation amount calculation unit 90 calculates the integration operation amount by integrating the deviation input calculated by the subtracting unit 94, and multiplying the integration gain Ki of a designation value identical to the integration gain multiplying part 522 of the shaft torque controller 5, and inputs this to the summing unit 91.

The summing unit 91 corresponds to the torque current command generator 54 of the shaft torque controller 5. The summing unit 91 generates an input signal to the nominal plant N, by adding the control input u obtained by this μ controller by inputting to the μ controller K the observation output y including the torque detection error as mentioned above, and the integration operation amount calculated by the integration operation amount calculation unit 90. The output signal of this summing unit 91 corresponds to the torque current command signal generated by the shaft torque controller 5 in the test system 1. As mentioned above, the value obtained by adding the output signal of the summing unit 91 and the signal obtained by weighting the second disturbance input w2 by the second input weighting function Gid(s) is inputted to the nominal plant N as the dynamo torque i1.

The first control amount output z1 is an output signal outputted from the generalized plant P via the first control amount output port 84. The first control amount output z1 corresponds to the deviation input (higher-order torque command signal—shaft torque detection signal) inputted to the integrator 52 in the shaft torque controller 5. In the generalized plant P, the first control amount output z1 is calculated by multiplying the first output weighting function Ge(s) by the deviation input inputted to the integration operation amount calculation unit 90. With the generalized plant P, it is possible to evaluate the deviation input to the integrator 52, by outputting such a first control amount output z1 from the first control amount output port 84. This first output weighting function Ge(s) is set so as to have an integral characteristic so that the shaft torque controller 5 including the shaft torque deviation suppressing function is obtained.

The second control amount output z2 is an output signal outputted from the generalized plant P via the second control amount output port 85. The second control amount output z2 corresponds to the second input outputted from the non-integrator 53 in the shaft torque controller 5. In the generalized plant P, the second control amount output z2 is calculated by multiplying the second output weighting function Gip(s) by the control input u outputted from the p controller K. With the generalized plant P, it is possible to evaluate the second input from the non-integrator 53, by outputting such a second control amount output z2 from the second control amount output port 85. This second output weighting function Gip(s) is set so as to have an integral characteristic, so that the integral gain of the integral element in the overall shaft torque controller 5 in which the p controller K is incorporated as the non-integrator 53, becomes equal to the integral gain Ki of the integrator 52.

The third control amount output z3 is an output signal outputted from the generalized plant P via the third control amount output port 86. The third control amount output z3 corresponds to the transmitted torque t1 in the test system 1. In the generalized plant P, the third control amount output z3 is calculated by multiplying the third output weighting function Gt(s) by the transmitted torque t1 outputted from the nominal plant N. With the generalized plant P, it is possible to evaluate the transmitted torque t1, by outputting such a third control amount output z3 from the third control amount output port 86. This third output weighting function Gt(s) is set based on the resonance characteristic of the device coupling the test piece W and dynamometer 21, so that the shaft torque controller 5 including the resonance suppressing function is obtained. More specifically, the third output weighting function Gt(s) is set so as to be larger weighting in a torsional resonance frequency band of a device coupling the test piece W and dynamometer 21, than in other frequency bands.

The fourth control amount output z4 is an output signal outputted from the generalized plant P via the fourth control amount output port 87. The fourth control amount output z4 corresponds to the torque current command signal outputted from the shaft torque controller 5 in the test system 1. In the generalized plant P, the fourth control amount output z4 is calculated by multiplying the fourth output weighting function Gir(s) by the output signal of the summing unit 91. With the generalized plant P, it is possible to evaluate the torque current command signal of the shaft torque controller 5, by outputting such a fourth control amount output z4 from the fourth control amount output port 87. This fourth output weighting function Gir(s) is set so as to be a larger weighting in the high frequency band than in the low frequency band, for example.

Figure 6:
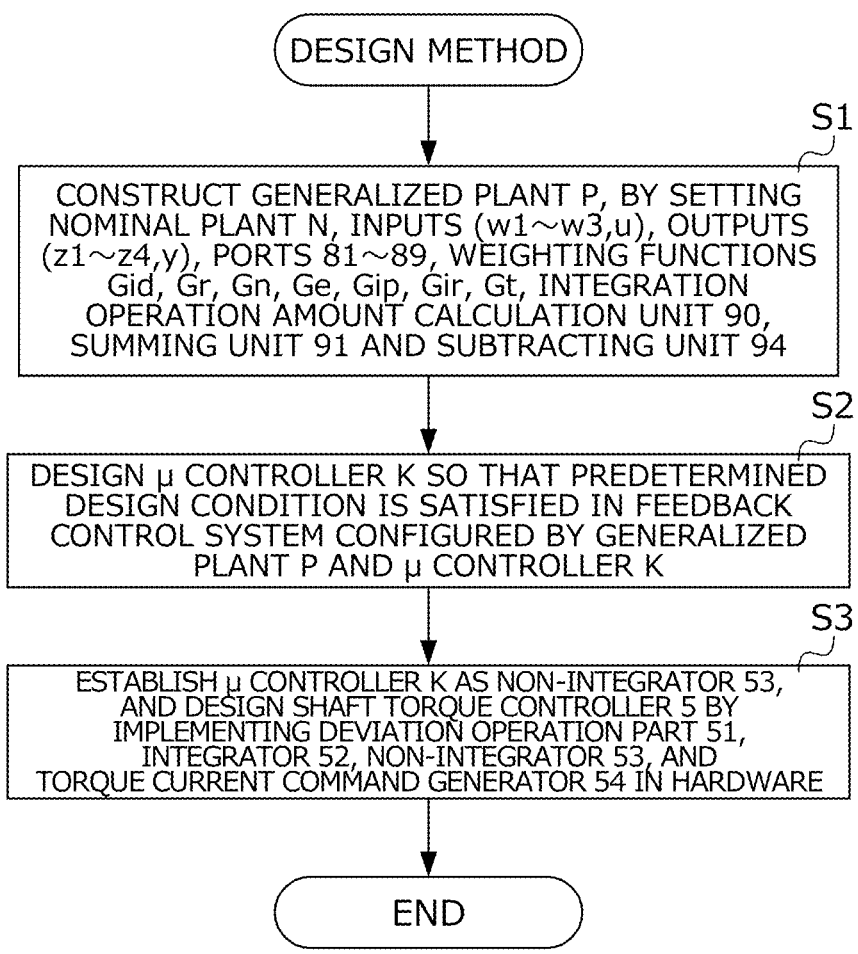
FIG. 6 is a flowchart showing the sequence of designing a shaft torque controller based on the generalized plant.

FIG. 6 is a flowchart showing a sequence of designing the shaft torque controller 5 based on the generalized plant P.

First, in Step S1, a generalized plant P such as that explained by referencing FIGS. 3 and 4 is constructed by setting the nominal plant N, various inputs (w1 to w3, u), various outputs (z1 to z4, y), various ports 81 to 89, weighting functions Gid(s), Gr(s), Gn(s), Ge(s), Gip(s), Gir(s), Gt(s), the integration operation amount calculation unit 90, summing unit 91, and subtracting unit 94, using a computer.

Next, in Step S2, the p controller K is designed by the computer, so that predetermined design requirements decided so that robust stability is realized are satisfied in the feedback control system 8 configured by combining the generalized plant P and p controller K. More specifically, such a p controller K, for example, is derived by performing iterative operation, based on the D-K iteration method on a computer.

Next, in Step S3, the shaft torque controller 5 is designed by establishing the p controller K obtained in Step S2 as a non-integrator 53, and implementing the deviation operation part 51, integrator 52, non-integrator 53 and torque current command generation part 54 in hardware including input/output ports in a combination such as that shown in the circuit diagram of FIG. 2.

Next, the characteristics of the shaft torque controller 5 designed based on the design method of the present embodiment will be explained while comparing with the characteristics of the shaft torque controller of the Comparative Example. Herein, shaft torque controller of the Comparative Example refers to a controller designed based on the controller design method disclosed in Non-patent Document 1. It should be noted that, in order to impart the shaft torque deviation suppressing function to this shaft torque controller of the Comparative Example, the control amount output port outputting the shaft torque deviation weighted by the weighting function including the integral characteristics was set in the generalized plant.

Figure 7:
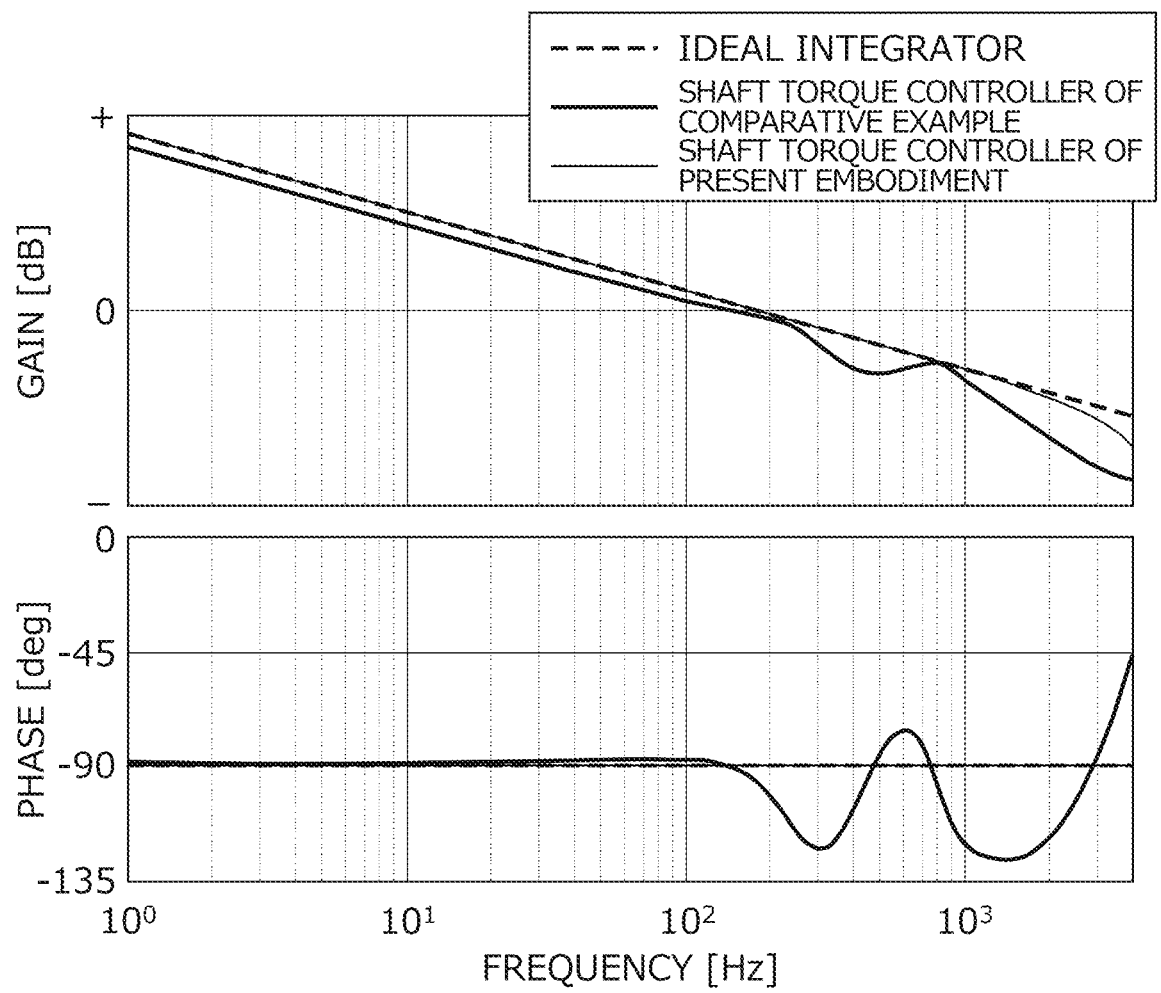
FIG. 7 is a Bode diagram showing the characteristics of a torque current command signal relative to a shaft torque deviation in each shaft torque controller.

FIG. 7 is a Bode diagram showing characteristics of the torque current command signal relative to the shaft torque deviation of each shaft torque controller. In FIG. 7, the bold line indicates the characteristics of the shaft torque controller of the Comparative Example. In addition, in FIG. 7, the bold dotted line indicates the characteristics of the ideal integrator required in the shaft torque controller. In addition, in FIG. 7, the fine line indicates the characteristics of the shaft torque controller 5 according to the present embodiment designed in accordance with the sequence explained by referencing FIGS. 2 to 6, upon setting the designated value of the integral gain Ki of the integrator 52 in FIG. 2 and the integral gain Ki of the generalized plant P in FIG. 4 so as to match the value of the integral gain of the ideal integrator shown by the bold dotted line.

With the controller design method disclosed in Non-patent Document 1, it is not possible to designate at the design stage the value of the integral gain of the shaft torque controlled ultimately obtained, as mentioned above. For this reason, the integral gain of the shaft torque controller of the Comparative Example as shown in FIG. 7 does not match the integral gain of the ideal integrator.

In contrast, with the design method of the present embodiment, by making the designated values of the integral gain Ki of the integrator 52 and integral gain Ki of the generalized plant P at the design stage so as to equal the value of the integral gain of the ideal integrator, it is possible to bring the value of the integral gain of the shaft torque controller 5 ultimately obtained close to the designated value set in the design stage. For this reason, as shown in FIG. 7, according to the design method of the present embodiment, it is possible to bring the value of the integral gain of the shaft torque controller 5 close to the value of the integral gain of the ideal integrator.

Although an embodiment of the present invention has been explained above, the present invention is not to be limited thereto. The configurations of detailed parts may be modified as appropriate within the scope of the gist of the present invention.

For example, in the above-mentioned embodiment, a case is explained of applying the design method for a shaft torque controller according to the present invention to the shaft torque controller 5 which controls the input-side dynamometer 21 connected to the input shaft SI of the test piece W, in the test system 1 for drive trains with the drive train of a vehicle as the test piece W; however, the present invention is not limited thereto. The design method for the shaft torque controller according to the present invention may be applied to a shaft torque controller which controls the first output-side dynamometer 31 connected to the output shaft SO1 and the second output-side dynamometer 32 connected to the output shaft SO2 of the test piece W in the test system 1 of a drive train.

In addition, in the above-mentioned embodiment, a case is explained of applying the design method for a shaft torque controller according to the present invention to a shaft torque controller establishing a test system 1 for a drive train with the drive train of a vehicle as the test piece W as the control target; however, the present invention is not limited thereto. The design method for a shaft torque controller according to the present invention may be applied to a shaft torque controller establishing as the control target a test system (so-called engine bench system) for an engine with the engine of a vehicle as the test piece.

In addition, with the above-mentioned embodiment, a case is explained of applying the design method of a feedback controller according to the present invention to a shaft torque controller establishing the test system 1 as the control target; however, the present invention is not limited thereto. The design method for a feedback controller according to the present invention may be applied to a feedback controller with a system that generates any control output as the control target when any control input is inputted, the feedback controller including an integrator which integrates deviation between the control output of the control target and the command for this control output, and calculates the first input by multiplying the integral gain of a designated value; a non-integrator which calculates the second input based on the control output of the control target; and a control input generator which generates a control input based on the first and second inputs, and inputs this to the control target.

EXPLANATION OF REFERENCE NUMERALS 1 test system
W test piece
SI input shaft (shaft)
SO1, SO2 output shaft
21 input-side dynamometer 21 (dynamometer)
23 input-side inverter (inverter)
25 input-side torque meter (shaft torque detector)
5 shaft torque controller
52 integrator
53 non-integrator
8 feedback control system
P generalized plant
N nominal plant
81 first disturbance input port
82 second disturbance input port
83 third disturbance input port
84 first control amount output port
85 second control amount output port
86 third control amount output port
90 integration operation amount calculation unit
91 summing unit
K μ controller (controller)
w1 first disturbance input
Gr(s) first input weighting function
w2 second disturbance input
Gid(s) second input weighting function
w3 third disturbance input
Gn(s) third input weighting function
z1 first control amount output
Ge(s) first output weighting function
z2 second control amount output
Gip(s) second output weighting function z3 third control amount output
Gt(s) third output weighting function

The invention claimed is:
1. A design method for a feedback controller that includes: an integrator which integrates deviation between a control output of a control target and a command for the control output, and calculates a first input by multiplying an integral gain of a designated value; a non-integrator which calculates a second input based on the control output; and a control input generator which generates the control input based on the first input and the second input, and inputs to the control target,
the design method comprising:
a design step of designing the controller such that satisfies a predetermined design condition using a computer, in a feedback control system including: a generalized plant including a nominal plant imitating input/output characteristics from the control input of the control target until the control output; and a controller which gives an input to the generalized plant based on output of the generalized plant; and
an implementation step of implementing the controller in the feedback controller as the non-integrator,
wherein the design step sets
in the generalized plant:
a first disturbance input port in which a first disturbance input corresponding to the command is inputted;
an integration operation amount calculation unit which integrates a deviation input between the first disturbance input and output of the nominal plant, and calculates an integration operation amount by multiplying integral gain of the designated value;
an summing unit which sums output obtained by the controller by inputting output of the nominal plant to the controller, and the integration operation amount, and generates input to the nominal plant;
a first control amount output port which outputs a value obtained by multiplying a predetermined first output weighting function by the deviation input as a first control amount output; and
a second control amount output port which outputs a value obtained by multiplying a predetermined second output weighting function by output of the controller as a second control amount output.

2. A design method for a shaft torque controller of a test system, which defines as a control target a test system including: a dynamometer coupled to a shaft of a test piece; an inverter which supplies electric power according to a torque current command signal to the dynamometer; and a shaft torque detector which generates a shaft torque detection signal according to a shaft torque between the dynamometer and the test piece, the shaft torque controller generating the torque current command signal so as to suppress deviation between a shaft torque command signal for the shaft torque and the shaft torque detection signal,
wherein the shaft torque controller includes: an integrator which integrates deviation between the shaft torque command signal and the shaft torque detection signal, and calculates a first input by multiplying integral gain of a designated value; a non-integrator which calculates a second input based on the shaft torque detection signal; and a torque current command generator which generates the torque current command signal based on the first input and the second input, and inputs to the inverter,
the design method comprising:
a design step of designing the controller such that satisfies a predetermined design condition using a computer, in a feedback control system including: a generalized plant including a nominal plant imitating an input/output characteristic from the torque current command signal of the control target until the shaft torque detection signal; and a controller which gives an input to the generalized plant based on output of the generalized plant; and
an implementation step of implementing the controller in the shaft torque controller as the non-integrator,
wherein the design step sets in the generalized plant:
a first disturbance input port in which a first disturbance input corresponding to the shaft torque command signal is inputted;
an integration operation amount calculation unit which integrates a deviation input between the first disturbance input and output of the nominal plant, and calculates an integration operation amount by multiplying integral gain of the designated value;
an summing unit which sums output obtained by the controller by inputting output of the nominal plant to the controller, and the integration operation amount, and generates input to the nominal plant;
a first control amount output port which outputs a value obtained by multiplying a predetermined first output weighting function by the deviation input as a first control amount output; and
a second control amount output port which outputs a value obtained by multiplying a predetermined second output weighting function by output of the controller as a second control amount output.

3. The design method for a shaft torque controller of a test system according to claim 2, wherein the design step further sets, in the generalized plant, a third control amount output port which outputs a value obtained by multiplying a predetermined third output weighting function by output of the nominal plant, as a third control amount output, and
sets the third output weighting function so as to be a larger weighting in a frequency band including a torsional resonance frequency between the dynamometer and the test piece, than in another frequency band.

4. The design method for a shaft torque controller of a test system according to claim 2, wherein the design step further sets in the generalized plant a third disturbance input port in which a third disturbance input corresponding to torque detection error by the shaft torque detection is inputted, and
inputs, to the integration operation amount calculation unit, a value obtained by subtracting a sum of output of the nominal plant and a value obtained by multiplying a predetermined third input weighting function by the third disturbance input, from a value obtained by multiplying a predetermined first input weighting function by the first disturbance input.

5. The design method for a shaft torque controller of a test system according to claim 4, wherein the design step further sets, in the generalized plant, a third control amount output port which outputs a value obtained by multiplying a predetermined third output weighting function by output of the nominal plant, as a third control amount output, and
sets the third output weighting function so as to be a larger weighting in a frequency band including a torsional resonance frequency between the dynamometer and the test piece, than in another frequency band.

6. The design method for a shaft torque controller of a test system according to claim 2, wherein the design step
further sets in the generalized plant a second disturbance input port in which a second disturbance input corresponding to torque control error of the dynamometer is inputted, and
inputs a sum of output of the controller, the integration operation amount, and a value obtained by multiplying a predetermined second input weighting function by the second disturbance input, to the nominal plant.

7. The design method for a shaft torque controller of a test system according to claim 6, wherein the design step
further sets, in the generalized plant, a third control amount output port which outputs a value obtained by multiplying a predetermined third output weighting function by output of the nominal plant, as a third control amount output, and
sets the third output weighting function so as to be a larger weighting in a frequency band including a torsional resonance frequency between the dynamometer and the test piece, than in another frequency band.

8. The design method for a shaft torque controller of a test system according to claim 6, wherein the design step
further sets in the generalized plant a third disturbance input port in which a third disturbance input corresponding to torque detection error by the shaft torque detection is inputted, and
inputs, to the integration operation amount calculation unit, a value obtained by subtracting a sum of output of the nominal plant and a value obtained by multiplying a predetermined third input weighting function by the third disturbance input, from a value obtained by multiplying a predetermined first input weighting function by the first disturbance input.

9. The design method for a shaft torque controller of a test system according to claim 8, wherein the design step
further sets, in the generalized plant, a third control amount output port which outputs a value obtained by multiplying a predetermined third output weighting function by output of the nominal plant, as a third control amount output, and
sets the third output weighting function so as to be a larger weighting in a frequency band including a torsional resonance frequency between the dynamometer and the test piece, than in another frequency band.

10. The design method for a shaft torque controller of a test system according to claim 2, wherein the first output weighting function and the second output weighting function include an integral characteristic.

11. The design method for a shaft torque controller of a test system according to claim 10, wherein the design step
further sets, in the generalized plant, a third control amount output port which outputs a value obtained by multiplying a predetermined third output weighting function by output of the nominal plant, as a third control amount output, and
sets the third output weighting function so as to be a larger weighting in a frequency band including a torsional resonance frequency between the dynamometer and the test piece, than in another frequency band.

12. The design method for a shaft torque controller of a test system according to claim 10, wherein the design step
further sets in the generalized plant a third disturbance input port in which a third disturbance input corresponding to torque detection error by the shaft torque detection is inputted, and
inputs, to the integration operation amount calculation unit, a value obtained by subtracting a sum of output of the nominal plant and a value obtained by multiplying a predetermined third input weighting function by the third disturbance input, from a value obtained by multiplying a predetermined first input weighting function by the first disturbance input.

13. The design method for a shaft torque controller of a test system according to claim 12, wherein the design step
further sets, in the generalized plant, a third control amount output port which outputs a value obtained by multiplying a predetermined third output weighting function by output of the nominal plant, as a third control amount output, and
sets the third output weighting function so as to be a larger weighting in a frequency band including a torsional resonance frequency between the dynamometer and the test piece, than in another frequency band.

14. The design method for a shaft torque controller of a test system according to claim 10, wherein the design step
further sets in the generalized plant a second disturbance input port in which a second disturbance input corresponding to torque control error of the dynamometer is inputted, and
inputs a sum of output of the controller, the integration operation amount, and a value obtained by multiplying a predetermined second input weighting function by the second disturbance input, to the nominal plant.

15. The design method for a shaft torque controller of a test system according to claim 14, wherein the design step
further sets, in the generalized plant, a third control amount output port which outputs a value obtained by multiplying a predetermined third output weighting function by output of the nominal plant, as a third control amount output, and
sets the third output weighting function so as to be a larger weighting in a frequency band including a torsional resonance frequency between the dynamometer and the test piece, than in another frequency band.

16. The design method for a shaft torque controller of a test system according to claim 14, wherein the design step
further sets in the generalized plant a third disturbance input port in which a third disturbance input corresponding to torque detection error by the shaft torque detection is inputted, and
inputs, to the integration operation amount calculation unit, a value obtained by subtracting a sum of output of the nominal plant and a value obtained by multiplying a predetermined third input weighting function by the third disturbance input, from a value obtained by multiplying a predetermined first input weighting function by the first disturbance input.

17. The design method for a shaft torque controller of a test system according to claim 16, wherein the design step
further sets, in the generalized plant, a third control amount output port which outputs a value obtained by multiplying a predetermined third output weighting function by output of the nominal plant, as a third control amount output, and
sets the third output weighting function so as to be a larger weighting in a frequency band including a torsional resonance frequency between the dynamometer and the test piece, than in another frequency band.

* * * * *